United States Patent
Becquet et al.

(10) Patent No.: US 12,227,287 B2
(45) Date of Patent: Feb. 18, 2025

(54) LANDING GEAR WITH RETRACTABLE ROCKER ARM PROVIDED WITH AN ELECTRIC MOTOR AND AIRCRAFT PROVIDED WITH AT LEAST ONE SUCH LANDING GEAR

(71) Applicant: AIRBUS HELICOPTERS, Marignane (FR)

(72) Inventors: Roland Becquet, Meyreuil (FR); Benjamin Ansquer, Saint Maur des Fosses (FR)

(73) Assignee: AIRBUS HELICOPTERS, Marignane (FR)

( * ) Notice: Subject to any disclaimer, the term of this patent is extended or adjusted under 35 U.S.C. 154(b) by 0 days.

(21) Appl. No.: 18/380,237

(22) Filed: Oct. 16, 2023

(65) Prior Publication Data

US 2024/0190559 A1  Jun. 13, 2024

(30) Foreign Application Priority Data

Dec. 8, 2022 (FR) ..................... 2212992

(51) Int. Cl.
*B64C 25/26* (2006.01)
*B64C 25/20* (2006.01)
*B64C 25/58* (2006.01)

(52) U.S. Cl.
CPC .............. *B64C 25/26* (2013.01); *B64C 25/20* (2013.01); *B64C 25/58* (2013.01)

(58) Field of Classification Search
CPC ......... B64C 25/26; B64C 25/20; B64C 25/58; B64C 25/60; B64G 1/625; B64G 1/62
See application file for complete search history.

(56) References Cited

U.S. PATENT DOCUMENTS

2008/0237396 A1  10/2008  Bietenhader
2012/0080559 A1*  4/2012  Keller ................. B64C 25/14
244/102 A
(Continued)

FOREIGN PATENT DOCUMENTS

EP  3248869 A1  11/2017
EP  3492375 A1  6/2019
(Continued)

OTHER PUBLICATIONS

French Search Report for French Application No. FR2212992, Completed by the French Patent Office, Dated May 24, 2023, 10 pages.

*Primary Examiner* — Rodney A Bonnette
(74) *Attorney, Agent, or Firm* — BROOKS KUSHMAN P.C.

(57) ABSTRACT

A retractable landing gear for an aircraft. The landing gear comprises a rocker arm hinged to a structure of the aircraft and carrying at least one wheel that is able to move between a deployed position and a retracted position, a shock-absorber hinged to the structure, a connecting rod connecting the rocker arm and the shock-absorber, a strut provided with two connecting links that are hinged to each other and respectively hinged to shock-absorber and connected to an actuator fastened to the structure. The connecting rod is out of alignment with the shock-absorber when a force applied to the shock-absorber is less than a predetermined force, and the landing gear comprises a locking device provided with an elastic return member and a stop device for locking the strut when the wheel is in the deployed position, and then for securing the wheel in the deployed position.

16 Claims, 6 Drawing Sheets

(56) References Cited

U.S. PATENT DOCUMENTS

| | | | |
|---|---|---|---|
| 2019/0144104 A1* | 5/2019 | Fortier | B64C 25/26 |
| | | | 244/102 R |
| 2019/0161175 A1* | 5/2019 | Satira | B64C 25/12 |
| 2019/0176972 A1* | 6/2019 | Henrion | B64C 25/24 |
| 2022/0081105 A1* | 3/2022 | Schmidt | B64C 25/34 |

FOREIGN PATENT DOCUMENTS

| | | |
|---|---|---|
| FR | 2884801 A1 | 10/2006 |
| FR | 2946319 A1 | 12/2010 |
| FR | 3001708 A1 | 8/2014 |
| FR | 3011816 A1 | 4/2015 |
| WO | 2008060338 A2 | 5/2008 |
| WO | 2017182955 A1 | 10/2017 |

* cited by examiner

LANDING GEAR WITH RETRACTABLE ROCKER ARM PROVIDED WITH AN ELECTRIC MOTOR AND AIRCRAFT PROVIDED WITH AT LEAST ONE SUCH LANDING GEAR

CROSS-REFERENCE TO RELATED APPLICATIONS

This application claims priority to French patent application No. FR 22 12992 filed on Dec. 8, 2022, the disclosure of which is incorporated in its entirety by reference herein.

TECHNICAL FIELD

The present disclosure belongs to the field of undercarriages for aircraft.

BACKGROUND

The present disclosure relates to a landing gear with a motorized retractable rocker arm intended to equip an aircraft and an aircraft provided with at least one such landing gear.

An aircraft conventionally comprises an undercarriage. The undercarriage is sometimes provided with a plurality of landing gears. A landing gear of an aircraft may comprise at least one wheel and one shock-absorber.

According to one example, the undercarriage may comprise two main landing gears and one auxiliary landing gear, each of which may be provided with a rocker arm.

For example, a landing gear with a rocker arm may comprise an oscillating gear strut referred to more simply as a "rocker arm". The gear strut is hinged to a load-bearing structure of the aircraft and carries at least one wheel. The gear strut, and indeed the wheel, may be retracted into a landing gear compartment during flight. A landing gear with a rocker arm then comprises a retraction device for moving the wheel from a deployed or extended position to a retracted or withdrawn position in order to stow all or part of the landing gear in the landing gear compartment during flight. For example, a strut provided with a shock-absorber and a hydraulic jack may serve as a retraction device.

For example, retractable landing gears like those described in documents EP 3 248 869 and WO 2008/060338 comprise a retraction system integrated with a shock-absorber and using the compression of the shock-absorber of the landing gear to move the landing gear from the deployed position to the retracted position. However, compressing such a shock-absorber requires considerable force, generally necessitating a hydraulic retraction system. Moreover, during a hard and/or forceful landing, considerable forces are applied to the shock-absorber and may damage the retraction system and indeed the shock-absorber and the airframe of the aircraft.

According to another example, document EP 3 492 375 describes a retractable landing gear for an aircraft comprising a shock-absorber linking the structure to a rocker arm assembly provided with a rocker arm carrying a wheel and a breaker strut formed from two connecting rods. The landing gear also comprises two linear actuators, one of which is an actuator connected to the breaker strut and the other is an actuator connected to the structure of the aircraft and to the rocker arm assembly. The two actuators permit the rocker arm assembly to rotate about two separate axes below the shock-absorber, in order to retract the rocker arm assembly. The shock-absorber then remains in a fixed position while the landing gear is being retracted. Such a retraction system is complex owing to the use of two actuators, the multiple links and the movements needed to retract and deploy the landing gear.

Document FR 3 001 708 describes a retractable undercarriage provided with a rocker arm carrying a wheel and a shock-absorbing jack. The shock-absorbing jack is provided with a body and a stem that is able to move in relation to the body. The undercarriage is provided with a knuckle joint comprising two hinges connected to the rocker arm and to the shock-absorbing jack respectively. The knuckle joint has an area that rests on a stop of the rocker arm when the undercarriage is in a deployed position.

Document FR 2 946 319 describes a landing gear with a rocker arm comprising a shock-absorber, a wheel connected to a movable stem of the shock-absorber, a breaker strut formed from two connecting rods hinged to each other and a stabilizing member connected to one of the connecting rods of the breaker strut. The stabilizing member is provided with two connecting links that are hinged to each other and kept aligned by a lock spring. The two connecting rods of the strut are kept aligned by the stabilizing member when the landing gear is in the deployed position. An actuator, such as a motor, is connected to one of the connecting links of the stabilizing member in order to move the landing gear assembly between the deployed and retracted positions.

Document FR 3 011 816 describes a landing gear with a rocker arm for a rotorcraft provided with a rocker arm connected to a wheel, a shock-absorber and an actuating cylinder, as well as a guide rail that is stationary in relation to the rotorcraft and a slider that slides along the guide rail with the assistance of the actuating cylinder. The shock-absorber is hinged to the slider and to the rocker arm. The actuating cylinder therefore makes it possible, via the movement of the slider along the rail, for the undercarriage to be moved between a deployed position and a retracted position.

The prior art also comprises document FR 2 884 801, that describes a retractable landing gear provided with a linear actuator, while document WO 2017/182955 describes a straight landing gear that can be retracted by rotation.

SUMMARY

The aim of the present disclosure is therefore to propose an alternative landing gear designed, for example, to limit the forces required to retract and deploy the landing gear, its space requirement and/or the effects of a hard or forceful landing on the landing gear.

An object of the present disclosure is a retractable landing gear for an aircraft, the landing gear comprising:
  a rocker arm intended to be hinged to a structure of the aircraft and carrying at least one wheel, said at least one wheel being able to move between a deployed position and a retracted position;
  a shock-absorber provided with a stem that slides in a body, the shock-absorber being intended to be hinged to the structure;
  a strut provided with a first connecting link and a second connecting link that are hinged to each other by a first mechanical link, the first connecting link being hinged to the shock-absorber; and
  an actuator.

This landing gear is remarkable in that the actuator is intended to be connected to the structure of the aircraft and connected to the second connecting link in order to rotate the second connecting link in relation to the structure, the landing gear comprising:

a connecting rod hinged to the shock-absorber by a second mechanical link with a single degree of rotational freedom and to the rocker arm, the connecting rod being out of alignment with the shock-absorber when a force less than a predetermined force is applied to the shock-absorber; and a locking device comprising an elastic return member and a stop device, the elastic return member being fastened by two ends respectively to the strut and to a hinged assembly comprising the rocker arm, the connecting rod and a third mechanical link connecting the rocker arm and the connecting rod, the elastic return member applying a pulling force between the strut and the hinged assembly, the stop device being configured to prevent the first and second connecting links from moving in relation to each other about an axis of rotation of the first mechanical link, under the action generated by the pulling force of the elastic return member when the wheel is in the deployed position.

An aircraft may comprise one or more retractable landing gears forming an undercarriage of the aircraft. The aircraft then comprises at least one housing that is able to receive at least one landing gear. A housing therefore allows a landing gear to be accommodated at least partially, or indeed totally, when the wheel is in the retracted position during flight.

The actuator allows the wheel to be moved from the deployed position to the retracted position, and conversely from the retracted position to the deployed position. The actuator is connected to the second connecting link and causes the second connecting link to move in relation to the structure of the aircraft, that therefore results in the simultaneous movements of the first connecting link, the shock-absorber, the connecting rod, the rocker arm and the wheel.

The wheel is positioned in the deployed position before landing and while the aircraft is on the ground. During flight, the wheel may be arranged in the retracted position, the landing gear then being partially or totally stowed in a housing of the aircraft.

The term "hinged" means that the two components that are hinged to each other are connected by a mechanical link comprising at least one degree of rotational freedom. Two components that are hinged to each other may, for example, be connected by a mechanical link with a single degree of rotational freedom, of the pivot type, such a pivot-type mechanical link permitting rotation about a single axis of rotation. Two components that are hinged to each other may alternatively be connected by a mechanical link with three degrees of rotational freedom, of the ball-joint type, permitting rotations about three axes of rotation intersecting at a point, or by a link with two degrees of rotational freedom, of the universal joint type, permitting rotations about two intersecting axes of rotation. When the landing gear comprises several mechanical links with a single degree of rotational freedom, the axes of rotation of these mechanical links, including the first mechanical link, are parallel with each other.

The first mechanical link connecting the first connecting link and the second connecting link is, for example, formed by a ball-joint link permitting relative rotational movements of the first connecting link and the second connecting link about three intersecting axes of rotation. Alternatively, the first mechanical link may be of the pivot or universal joint type. In the case of a pivot link, the single axis of rotation is, for example, oriented substantially horizontally, when the aircraft is resting on horizontal ground.

The second mechanical link connecting the connecting rod and the shock-absorber is formed by a pivot link permitting relative rotational movements of the connecting rod and the shock-absorber about a single axis of rotation.

The third mechanical link connecting the rocker arm and the connecting rod may be formed by a ball-joint link permitting relative rotational movements of the rocker arm and the connecting rod about three intersecting axes of rotation. Alternatively, the third mechanical link may be a pivot link or a universal joint link.

The shock-absorber and the connecting rod thus constitute a main brace of the rocker arm when the wheel is in the deployed position. The strut, and therefore the first and second connecting links, constitute a secondary brace that serves, in particular, to hold and lock in position the main brace and, therefore, the rocker arm and the wheel when the wheel is in the deployed position.

The landing gear according to the disclosure therefore benefits from a double brace ensuring that the wheel is effectively held in the deployed position.

Furthermore, the connecting rod is out of alignment with the shock-absorber, while forming an obtuse angle with the shock-absorber, in the deployed position, when a force less than a predetermined force is applied to the shock-absorber. A force less than the predetermined force is, for example, applied to the shock-absorber when no force is applied to the wheel, i.e., when no force apart from those resulting from the acceleration of the Earth's gravity is applied to the wheel. The connecting rod is therefore out of alignment with the shock-absorber in the deployed position when the aircraft equipped with the landing gear is in flight. The connecting rod is also out of alignment with the shock-absorber in the deployed position when the aircraft equipped with the landing gear is stationary on the ground, i.e., is not moving, the force applied to the shock-absorber then being less than the predetermined force.

When the aircraft equipped with the landing gear is in flight or is stationary on the ground, the stem of the shock-absorber is in a position described as the "median" position in relation to the body of the shock-absorber, i.e., the stem is not fully inserted into the body, and can move both into the body and out of the body depending on the forces that may be applied to the wheel. When a force less than a predetermined force is applied to the shock-absorber, the shock-absorber can therefore be extended and compressed.

The connecting rod and the shock-absorber thus form an angle greater than 0 degree (0°), and more precisely of between 0 degree (0°) and 180 degrees (180°), when a force less than a predetermined force is applied to the shock-absorber.

This disalignment between the connecting rod and the shock-absorber advantageously ensures that the strut is tensioned, guaranteeing effective locking of the main brace formed by the shock-absorber and the connecting rod over the entire compression range of the shock-absorber and, therefore, effective locking of the deployed position of the wheel of the landing gear according to the disclosure.

The kinematics of the landing gear, and in particular the kinematics of the rocker arm and the connecting rod, also make it possible to gradually reduce this disalignment between the connecting rod and the shock-absorber when the shock-absorber is compressed, the force applied to the shock-absorber increasing, for example when the wheel comes into contact with the ground during landing and when the airframe of the aircraft moves towards the ground during this landing operation. This reduction in disalignment comprises an increase in the angle mentioned above between the connecting rod and the shock-absorber and helps limit the shear stress in the shock-absorber. Limiting the shear stress in the shock-absorber helps reduce friction between the stem and the body of the shock-absorber during the compression of the shock-absorber, for example, thus improving the operation, efficiency and effectiveness of the shock absorber.

Moreover, the locking of the strut connecting the structure to the shock-absorber by means of the locking device, when the wheel is in the deployed position, helps prevent any angular movement of the shock-absorber when it is being compressed. This feature advantageously makes it possible to maintain a moment arm between the shock-absorber and an axis of rotation of the rocker arm in relation to the structure of the aircraft, that is substantially constant over the entire compression stroke of the shock-absorber, in particular when the aircraft is landing, thus ensuring a mechanical advantage.

The locking of the strut when the wheel is in the deployed position is ensured by the pulling force generated by the elastic return member on this strut and by the presence of the stop device. Indeed, the stop device makes it possible to limit the angular displacement of the first connecting link and the second connecting link about the axis of rotation of the first mechanical link under the action of the pulling force of the elastic return member and to prevent a relative angular movement of the first connecting link and the second connecting link in one direction about the axis of rotation of the first mechanical link when the maximum angular displacement is reached.

This locking of the strut advantageously prevents unwanted retraction, for example when the landing gear is subjected to vibrations, impacts, accelerations and forces on the ground, within predefined limits. The actuator allows the strut to be unlocked by countering the pulling force generated by the elastic return member and by moving the second connecting link, in order to move the wheel from the deployed position to the retracted position.

The elastic return member is thus dimensioned so that this locking of the strut is able to withstand these vibrations, impacts, accelerations and forces on the ground, within predefined limits. The elastic return member may for example comprise a coil spring loaded in tension.

The presence of this locking of the strut also makes it possible not to introduce torque or force into the actuator when the wheel is in the deployed position. The actuator is therefore not permanently loaded, significantly extending its service life as a result of the disclosure.

Moreover, the locking of the strut, combined with the double brace, advantageously makes it possible to no longer load the actuator once the wheel is in the deployed position and the strut has been locked. The actuator then applies no force or torque to the second connecting link, and it consumes little electrical energy, if any at all.

Furthermore, the wheel may be kept in the retracted position by means of the actuator, for example. The actuator may apply a force or a torque to the strut that is sufficient to keep it in position in this way and, in particular, counters the weights of the wheel and the rocker arm. The kinematics of the landing gear and the arrangement of the elastic return member are advantageously defined in such a way as to reduce the force or the torque required at the actuator to keep the wheel in the retracted position. Alternatively, or additionally, an immobilizing member may immobilize the actuator when the wheel is in said retracted position.

Similarly, these kinematics of the landing gear and the arrangement of the elastic return member are advantageously defined in such a way as to reduce the force or the torque required to move the wheel between the retracted and deployed positions.

Furthermore, the innovative kinematics of the landing gear according to the disclosure advantageously allow emergency deployment of the wheel from the retracted position to the deployed position by force of gravity, for example in the event of a failure or malfunction of the actuator.

The landing gear according to the disclosure may comprise one or more of the following features, taken individually or in combination.

According to one example, the stop device may comprise a first stop arranged on the first connecting link and a second stop arranged on the second connecting link. The first stop and the second stop are in contact with each other when the wheel is in the deployed position and under the pulling force generated by the elastic return member. The first stop and the second stop therefore together help limit the angular displacement of the first connecting link and the second connecting link about the axis of rotation of the first mechanical link under the action of the elastic return member.

Alternatively, the stop device may comprise a stop arranged on the first connecting link and coming into contact with the second connecting link under the action of the elastic return member so as to limit the angular displacement of the first connecting link and the second connecting link about the axis of rotation of the first mechanical link.

Alternatively, or additionally, the stop device may comprise a stop arranged on the second connecting link and coming into contact with the first connecting link under the action of the elastic return member so as to limit the angular displacement of the first connecting link and the second connecting link about the axis of rotation of the first mechanical link.

Alternatively, the stop device may comprise a first stop arranged on the first connecting link and coming into contact with the shock-absorber under the action of the elastic return member so as to limit the angular displacement of the first connecting link in relation to the shock-absorber, and a second stop arranged on the second connecting link and coming into contact with the structure or the actuator under the action of the elastic return member so as to limit the angular displacement of the second connecting link in relation to the structure. Alternatively, the first stop may be arranged on the shock-absorber and come into contact with the first connecting link. Alternatively, the second stop may be arranged on the structure or the actuator and come into contact with the second connecting link.

According to another example compatible with the preceding examples, the actuator may be a rotary electric motor. The second connecting link is then connected to a rotating output shaft of the electric motor, a fixed part of the electric motor being connected to the structure of the aircraft. For example, a first end of the second connecting link is secured to such a rotating output shaft of the electric motor, the second end of the second connecting link being connected to the first connecting link via the first mechanical link. The electric motor therefore causes the second connecting link to rotate about its first end, thereby moving the first connecting link and the wheel so as to move the wheel from the retracted position to the deployed position, and vice versa.

Using such a rotary electric motor as an actuator simplifies the arrangement of the landing gear according to the disclosure compared to a landing gear of the prior art using, for example, a hydraulic jack. Moreover, such a rotary electric motor consumes less energy, and its use is possible as a result of the particular kinematics of the landing gear according to the disclosure, that requires lower maneuvering torques to move the wheel between the retracted and deployed positions and a lower torque to keep the wheel in the retracted position. Using such a rotary electric motor as an actuator also allows the second connecting link to be moved through a large angle, for example greater than 90°, and possibly nearly 180°, that, combined with the kinematics of the landing gear, means that the landing gear has a small space requirement when the wheel is in the retracted position.

Advantageously, using such an electric motor as an actuator may make it possible, during the emergency deployment of the wheel by force of gravity, to control the speed at which the wheel is deployed, by short-circuiting the electric motor, that then acts as a brake.

Alternatively, the actuator may be a linear electric, pneumatic or hydraulic jack, hinged to the structure of the aircraft and to the second connecting link, a first end of the second connecting link being hinged to the structure and the second end of the second connecting link being connected to the first connecting link via the first mechanical link. As a result, this jack causes the second connecting link to rotate about its first end, thereby moving the first connecting link, the shock-absorber, the connecting rod and the rocker arm, so as to move the wheel from the retracted position to the deployed position, and vice versa.

According to another example compatible with the preceding examples, the connecting rod may be hinged to the stem and the first connecting link may be hinged to the body, the body being hinged to the structure.

Alternatively, the connecting rod may be hinged to the body and the first connecting link may be hinged to the stem, the stem being hinged to the structure.

According to another example compatible with the preceding examples, an axis of rotation of the first connecting link in relation to the shock-absorber and an axis of rotation of the second connecting link in relation to the structure may form a substantially horizontal plane, the wheel being in the deployed position, such a horizontal plane being perpendicular to a direction of Earth's gravity. The axis of rotation of the second connecting link in relation to the structure is, for example, the axis of rotation of the actuator when the actuator is a rotary electric motor.

This positioning of the axes of rotation de the first connecting link in relation to the shock-absorber and the second connecting link in relation to the structure helps minimize the forces required to maneuver the landing gear, in particular to move the wheel from the deployed position to the retracted position, and vice versa, the moment arm between the secondary brace and the mechanical link between the shock-absorber and the structure being maximized.

According to another example compatible with the preceding examples, an axis of rotation of the first connecting link in relation to the shock-absorber, an axis of rotation of the second connecting link in relation to the structure and the axis of rotation of the first connecting link in relation to the second connecting link may be parallel with each other and coplanar when the wheel is in the deployed position. The stop device may be configured to allow such an alignment in the deployed position.

This parallelism and coplanarity of the three axes of rotation mentioned above helps minimize the forces required for the actuator to maneuver the landing gear, in particular to move the wheel from the deployed position to the retracted position, and vice versa.

In this way, when the first connecting link and the second connecting link are straight, the first connecting link and the second connecting link are aligned in the deployed position. The angle between the first connecting link and the second connecting link about the axis of rotation of the first mechanical link is in this case substantially equal to 180°.

According to another example compatible with the preceding examples, the elastic return member may be fastened by one of its ends to the first connecting link, the second connecting link or the first mechanical link. The elastic return member is preferably fastened directly to the first mechanical link. The elastic return member may also be fastened to the first connecting link or the second connecting link, this fastening point being situated close to the first mechanical link. The other end of the elastic return member may be fastened to the third mechanical link between the rocker arm and the connecting rod, to the rocker arm or to the connecting rod. This arrangement of the elastic return member helps minimize the forces required for the actuator to maneuver and move the wheel from the deployed position to the retracted position, and vice versa.

According to another example compatible with the preceding examples, a first length of the first connecting link may be greater than a second length of the second connecting link.

These dimensions of the first connecting link and the second connecting link also help minimize the forces required for the actuator to maneuver the landing gear. The first length of the first connecting link may be defined between two ends of the first connecting link, in a direction passing through the axes of rotation of the first connecting link in relation to the shock-absorber and the second connecting link respectively. The second length of the second connecting link may be defined between two ends of the second connecting link, in a direction passing through the axes of rotation of the second connecting link in relation to the structure and the first connecting link respectively.

For example, the second length of the second connecting link may be between a quarter ($\frac{1}{4}$) and a fifth ($\frac{1}{5}$) of the first length of the first connecting link.

According to another example compatible with the preceding examples, the connecting rod may be straight and aligned with the shock-absorber when the shock-absorber is compressed under a force equal to the predetermined force, the wheel being in the deployed position. When such a force equal to the predetermined force is applied to the shock-absorber, the shock-absorber is compressed in such a way that the stem is inserted almost completely into the body.

A considerable force may sometimes be applied to the wheel and transmitted at least partially, via the connecting rod, to the shock-absorber. Such a considerable force is, for example, applied to the wheel by the ground during landing. Under the action of this considerable force, the shock-absorber is compressed, possibly almost completely, i.e., the stem may come to rest against an end-of-travel stop arranged in the body when the force applied to the shock-absorber is substantially equal to, or indeed greater than, the predetermined force.

The kinematics of the landing gear according to the disclosure are defined in such a way that the connecting rod, that may be straight, is aligned with the shock-absorber when the shock-absorber is compressed under the effect of a force substantially equal to this predetermined force. As a result, the connecting rod can transmit the majority of this considerable force resulting from the reaction of the ground on the wheel to the shock-absorber so that the shock-absorber absorbs and dissipates as much of this considerable force as possible in order to protect the connecting rod and/or the structure of the aircraft.

Alternatively, the connecting rod may remain out of alignment with the shock-absorber when the shock-absorber is compressed under a force equal to the predetermined force, the wheel being in the deployed position. The angle mentioned above between the connecting rod and the shock-absorber is then very close to 180° while remaining strictly below 180° and is, for example, between 175° and 180°.

According to another example compatible with the preceding examples, the shock-absorber may comprise a deformable end-of-travel stop arranged in the body, the end-of-travel stop being configured to be deformed when the shock-absorber is compressed under the effect of a force greater than the predetermined force, the wheel being in the deployed position.

The end-of-travel stop may thus be deformed under the effect of a force greater than the predetermined force.

The deformable end-of-travel stop thus acts as a fuse to dissipate some of the energy transmitted to the wheel, and then to the shock-absorber, for example during a landing conventionally referred to as a "hard landing".

For example, the deformable end-of-travel stop comprises a tube forming a hollow body and configured to buckle when a force greater than or equal to the predetermined force is applied to the shock-absorber.

According to another example compatible with the preceding examples, the landing gear may comprise a lever, the lever being configured to be in contact with the first connecting link when the shock-absorber is compressed under the effect of a force substantially equal to the predetermined force, the wheel being in the deployed position. The lever is then in contact with the first connecting link without causing the first connecting link to move. The lever is thus arranged in such a way as to cause the first connecting link to move when the shock-absorber is compressed under the effect of a force greater than the predetermined force.

The lever may alternatively be very close to the first connecting link, without being in contact with the first connecting link, when the shock-absorber is subjected to a force substantially equal to the predetermined force. The lever comes into contact with and then then moves the first connecting link when the shock-absorber is compressed under the effect of a force greater than the predetermined force.

When the shock-absorber is compressed under the effect of a force greater than the predetermined force, the lever thus causes the first connecting link to move in relation to the shock-absorber, causing the second connecting link to move about the axis of rotation of the first mechanical link. The strut is then unlocked. The wheel can then be retracted.

The predetermined force and the shock-absorber are defined, for example, so that the landing gear is unlocked and the wheel is no longer in the deployed position before the maximum energy absorption capacity of the shock-absorber is reached. The predetermined force is therefore less than or equal to a maximum force that the shock-absorber is able to absorb.

This unlocking of the strut, that may be referred to as "retraction", allows the forces that the shock-absorber has to absorb to be cushioned. This retraction of the strut, and the subsequent unlocking of the deployed position of the wheel, advantageously prevents too much of the force applied to the wheel from being transmitted to the structure of the aircraft, limiting or even preventing damage to this structure or to the landing gear itself.

Moreover, the lever may be arranged on the connecting rod or on the stem when the connecting rod is hinged to the stem or on the body when the connecting rod is hinged to the body.

Furthermore, when the shock-absorber comprises a deformable end-of-travel stop arranged in the body, as previously described, the lever may be configured to be very close to, or indeed in contact with, the first connecting link when the stem is resting against the end-of-travel stop.

Moreover, the shock-absorber may comprise a valve configured to connect an internal space situated inside the body and an external environment situated outside the body, the valve opening when a pressure inside the body is greater than a predetermined pressure. The valve thus prevents the pressure inside the body of the shock-absorber from building up too much when a force greater than or equal to the predetermined force is applied to the shock-absorber. An excessive build-up of pressure inside the body may, for example, prevent the stem from resting against a deformable end-of-travel stop. According to another example, the shock-absorber may comprise a valve configured to connect the chambers to either side of a throttling diaphragm of the shock-absorber, helping to cushion the throttling forces above a predefined value.

The present disclosure also relates to an aircraft comprising one or more landing gears as described previously.

This aircraft may for example comprise three landing gears and three housings into which these landing gears are respectively at least partially retracted and stowed.

BRIEF DESCRIPTION OF THE DRAWINGS

The disclosure and its advantages appear in greater detail in the context of the following description of embodiments given by way of illustration and with reference to the accompanying figures, wherein.

DETAILED DESCRIPTION

Figure 1:
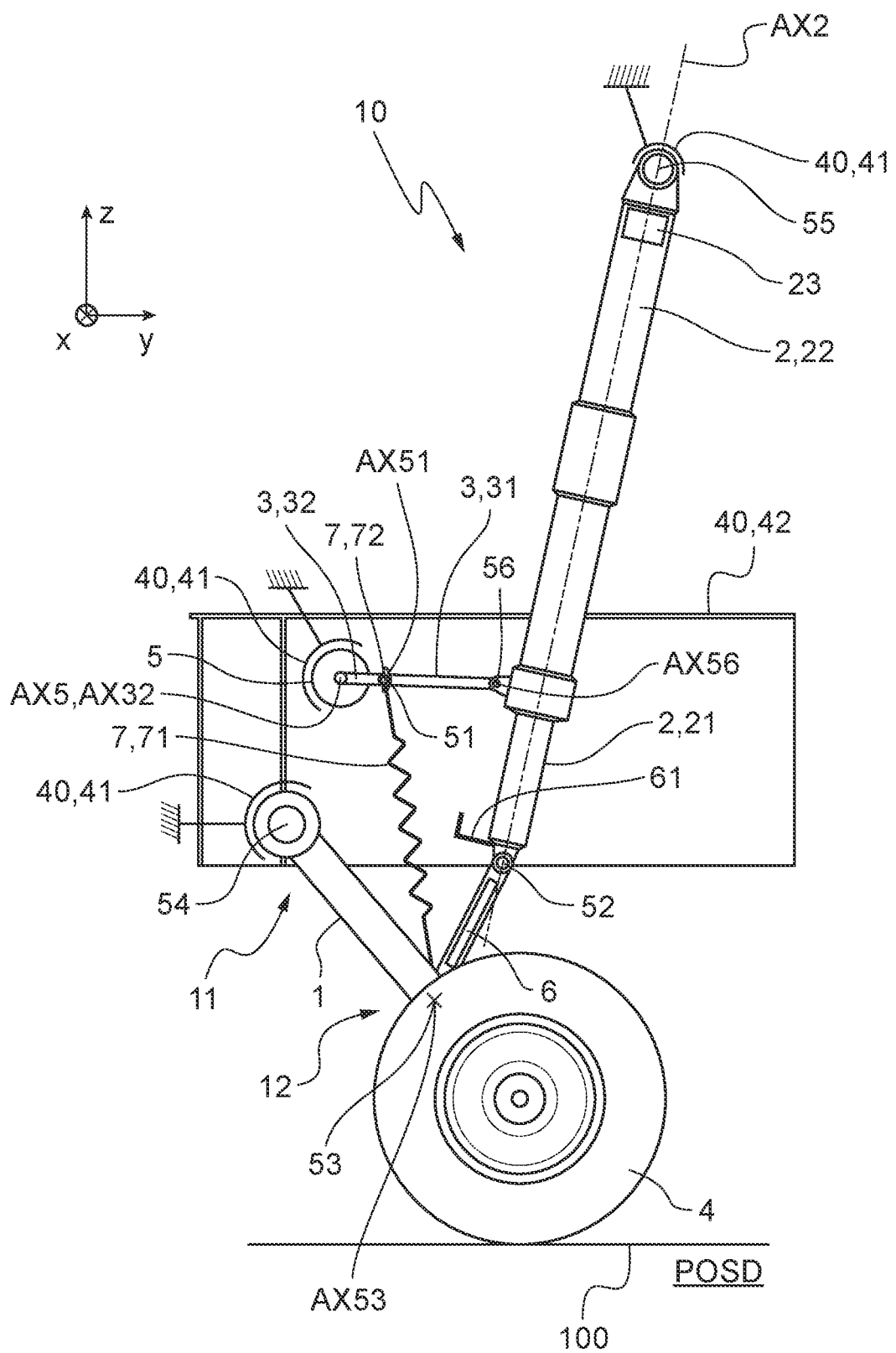
FIG. 1 shows a landing gear according to the disclosure when the wheel is in the deployed position.

Elements that are present in more than one of the figures are given the same references in each of them.

A retractable landing gear 10 according to the disclosure is shown in FIGS. 1 to 8, the landing gear 10 being connected to a structure 41 of an aircraft 40.

An orthogonal reference frame (X,Y,Z) is shown in the figures. An elevation direction Z extends upwards, parallel to the direction of Earth's gravity. A direction X and a direction Y extend perpendicular to the elevation direction Z and perpendicular to each other. The plane (X,Y) thus forms a horizontal plane, i.e., a plane perpendicular to the direction of Earth's gravity, and the directions X and Y form horizontal directions.

An aircraft 40 may comprise an undercarriage comprising one or more landing gears 10. An undercarriage of an aircraft 40 may, for example, comprise three landing gears 10.

A retractable landing gear 10 according to the disclosure comprises at least one wheel 4 and a rocker arm 1 extending from a first end region 11 hinged to the structure 41 by a link referred to as the "fourth mechanical link 54" to a second end region 12 carrying the wheel or wheels 4. In order to move the rocker arm 1, the retractable landing gear 10 also comprises an actuator 5 connected to the structure 41.

The retractable landing gear 10 comprises a shock-absorber 2 provided with a stem 21 that slides in a body 22. The shock-absorber 2 is connected to the rocker arm 1 by a connecting rod 6. One end of the stem 21 may be hinged to the connecting rod 6 by a connection referred to as the "second mechanical link 52", one end of the body 22 being hinged to the structure 41 by a connection referred to as the "fifth mechanical link 55" as shown in the figures. Alternatively, the stem 21 may be hinged to the structure 41, the body 22 being hinged to the connecting rod 6.

The connecting rod 6 is also hinged to the rocker arm 1 by a connection referred to as the "third mechanical link 53".

The connecting rod 6 is arranged in such a way as to be out of alignment with the shock-absorber 2 when a force less than a predetermined force is applied to the shock-absorber 2, the wheel 4 being in the deployed position POSD. The connecting rod 6 and the shock-absorber 2 then form an angle strictly greater than 0° and strictly less than 180°. The wheel 4 of the landing gear 10 is in this case not subjected to any force apart from that resulting from the acceleration of the Earth's gravity, the aircraft 40 being in flight or on the ground.

The retractable landing gear 10 comprises a strut 3 provided with a first mechanical link 51 having at least one degree of rotational freedom, a first connecting link 31 and a second connecting link 32 that are hinged to each other by the first mechanical link 51. For example, the first mechanical link 51 may be a ball-joint link having three degrees of rotational freedom. Alternatively, the first mechanical link 51 may be a pivot link and comprise a pin passing through holes arranged in the first connecting link 31 and the second connecting link 32. Alternatively, the first mechanical link 51 may be a universal joint link.

The first connecting link 31 is also hinged to the shock-absorber 2 by a connection referred to as the "sixth mechanical link 56" while the second connecting link 32 is connected to the actuator 5. According to the example shown in the figures, the first connecting link 31 is hinged to the body 22 of the shock-absorber 2.

The third, fourth, fifth and sixth mechanical links 53-56 comprise at least one degree of rotational freedom, and possibly three degrees of rotational freedom. For example, the third, fourth, fifth and sixth mechanical links may each comprise a single pivot link. In this case, the first, second, third, fourth, fifth and sixth mechanical links each allow rotation about axes of rotation that are parallel with each other and parallel to the direction X, according to the example shown in the figures.

Alternatively, the first, third, fourth, fifth and sixth mechanical links may each comprise a ball-joint link or a universal joint link.

The second mechanical link 52 comprises a single degree of rotational freedom and is, for example, a pivot link. This single degree of freedom permits rotation about a single axis parallel to the direction X according to the example shown in the figures.

Moreover, the retractable landing gear 10 comprises a locking device 7 comprising an elastic return member 71 and a stop device 72. The elastic return member 71 comprises two ends fastened respectively to the strut 3 and to a hinged assembly comprising the rocker arm 1, the connecting rod 6, and the third mechanical link 53. The elastic return member 71 can thus generate a pulling force between the strut 3 and the hinged assembly. The elastic return member 71 may for example be a coil spring loaded in tension.

The elastic return member 71 may for example be fastened by one of its ends to the first connecting link 31, the second connecting link 32 or the first mechanical link 51. The elastic return member 71 is preferably fastened directly to the first mechanical link 51 or to the first connecting link 31 close to the first mechanical link 51 or to the second connecting link 32 close to the first mechanical link 51.

The other end of the elastic return member 71 may be fastened to the hinged assembly, and more specifically to the third mechanical link 53, the rocker arm 1 or the connecting rod 6. When the elastic return member 71 is fastened to the rocker arm 1 or the connecting rod 6, the fastening point of the elastic return member 7 may be situated close to the third mechanical link 53.

The stop device 72 may comprise one or more stops 35,36 in order to prevent the first and second connecting links 31,32 from rotating in relation to each other about an axis of rotation AX51 of the first mechanical link 51 as a result of the pulling force generated by the elastic return member 71.

The stop device 72 may, according to the example shown, comprise a first stop 35 on the first connecting link 31 and a second stop 36 on the second connecting link 32. The first stop 35 and the second stop 36 may thus be in contact with each other as a result of the application of this pulling force generated by the elastic return member 71 in the deployed position POSD and thus limit the amplitude of the relative rotational movement of the first connecting link 31 and the second connecting link 32 about the axis AX51 of rotation of the first mechanical link 51.

Alternatively, the stop device 72 may for example comprise a stop that may be arranged on the first connecting link 31 and come into contact with the second connecting link 32 under the action of the elastic return member 71 or conversely may be arranged on the second connecting link 32 and come into contact with the first connecting link 31 under the action of the elastic return member 71.

Alternatively, the stop device 72 may also comprise a first stop limiting the movement of the first connecting link 31 in relation to the shock-absorber 2 and a second stop limiting the movement of the second connecting link 32 in relation to the structure 41 or the actuator 5 under the action of the elastic return member 71.

Moreover, the actuator 5 is thus connected to the structure 41 and to the second connecting link 32 in order to rotate the second connecting link 32 in relation to the structure 41. The actuator 5 therefore allows the wheel 4 to be moved between a deployed position POSD and a retracted position POSR.

According to the example shown in the figures, the actuator 5 is an electric motor. Alternatively, the actuator 5 may be a jack.

Figure 2:
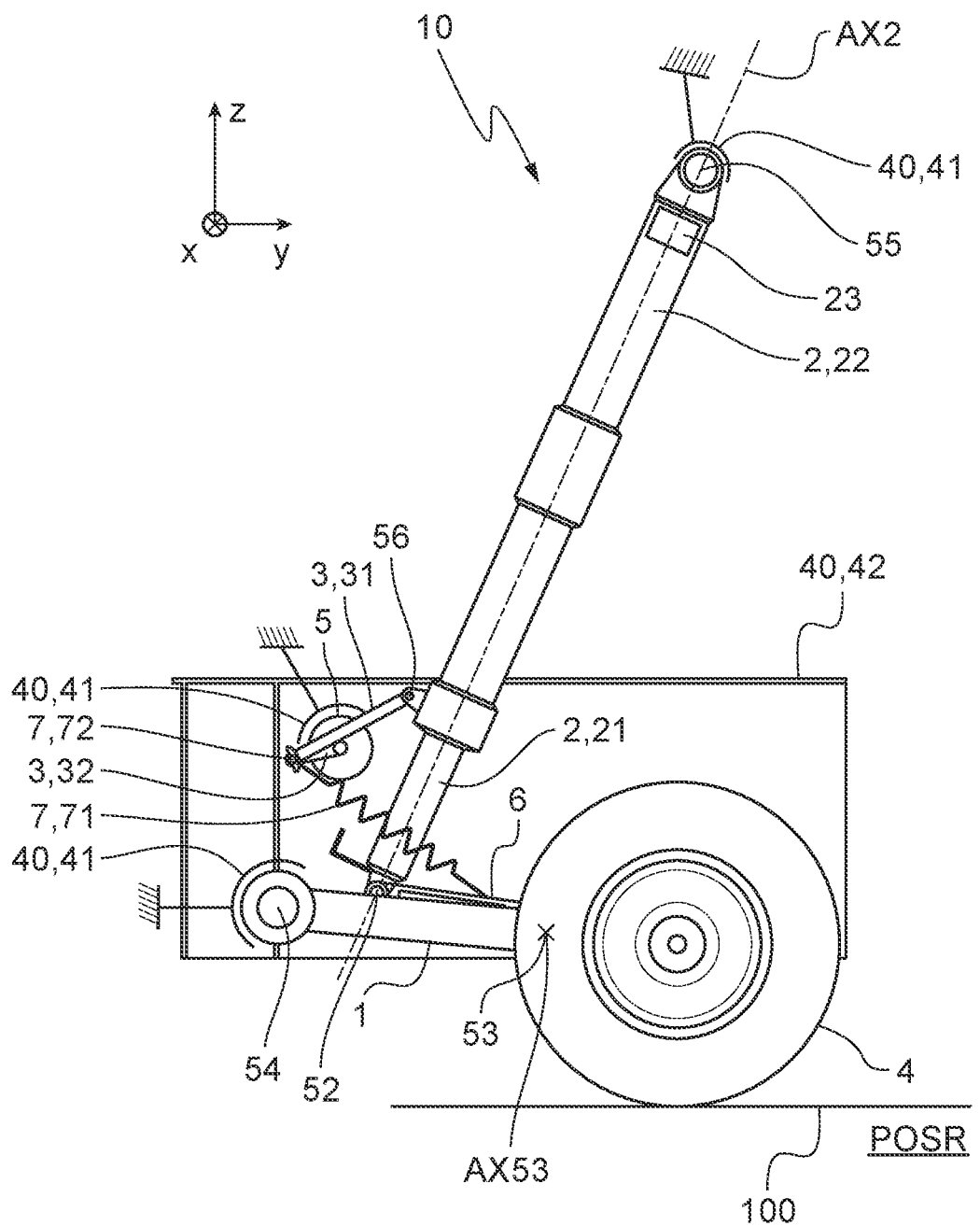
FIG. 2 shows the landing gear of FIG. 1 when the wheel is in the retracted position.
Figure 3:
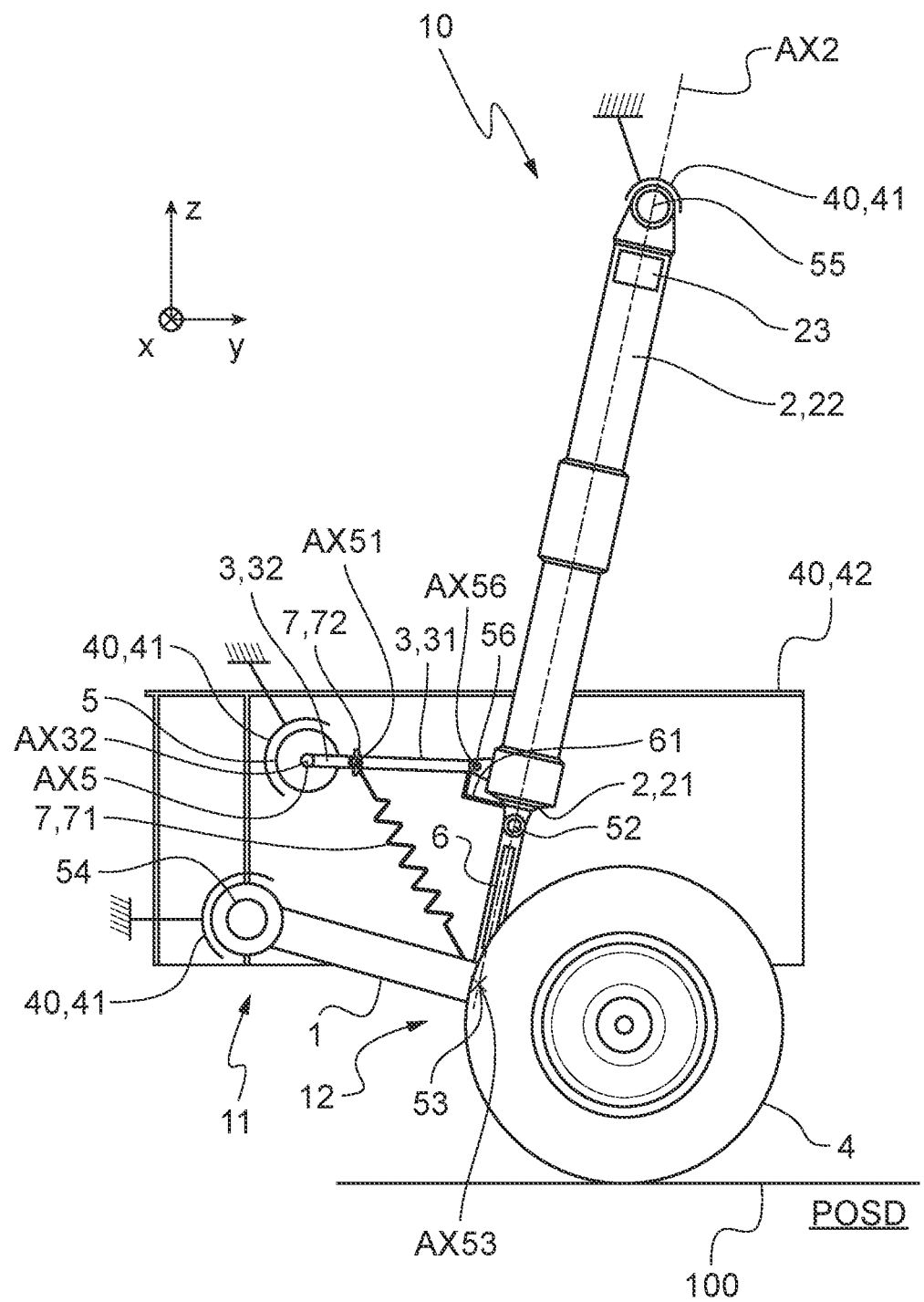
FIG. 3 shows the landing gear of FIG. 1 when the wheel is in the deployed position with the shock-absorber compressed.

When the wheel 4 is in the retracted position POSR, the landing gear 10 is positioned partially or totally inside a housing 42 of the aircraft 40. In FIG. 2, the landing gear 10 is shown in an embodiment wherein it is partially stowed in the housing 42. The wheel 4 is in the retracted position POSR when the aircraft 40 is in flight, in particular in order to reduce the aerodynamic drag generated by the landing gear 10 as the aircraft 40 moves forward during flight.

In the deployed position POSD, the wheel 4 of the landing gear 10 may be positioned totally outside the housing 42, as shown in FIG. 1, the wheel 4 being in contact with the ground 100. The wheel 4 is in the deployed position POSD when the aircraft 40 is on the ground, before a landing phase and after take-off. In FIGS. 1, 3 and 5 to 8, the landing gear 10 is resting on horizontal ground 100.

The landing gear 10 therefore allows the aircraft 40 to taxi on the ground 100 and absorbs the impact of the aircraft 40 landing on the ground 100, in particular as a result of the shock-absorber 2 and the particular kinematics of the landing gear 10 according to the disclosure.

The landing gear 10 thus comprises a particular architecture comprising two complementary braces that together help effectively keep the wheel 4 in the deployed position POSD when the landing gear 10 is subjected to various stresses such as vibrations, impacts, accelerations and forces on the ground, while remaining within predefined limits. The landing gear 10 comprises, in the deployed position POSD, a main brace of the rocker arm 1 formed by the shock-absorber 2, the connecting rod 6 and the third mechanical link 53, and a secondary brace of the shock-absorber 2 formed by the strut 3, and therefore the first connecting link 31, the second connecting link 32 and the first mechanical link 51.

The arrangement of the elastic return member 71 combined with the architecture of the landing gear 10 also makes it possible to ensure the locking of the strut 3, and therefore the secondary brace, in order to withstand these different stresses. Furthermore, the disalignment of the connecting rod 6 in relation to the shock-absorber 2 ensures that the strut 3 is tensioned, thus guaranteeing effective locking of the wheel 4 in the deployed position POSD.

This arrangement of the elastic return member 71 combined with the architecture of the landing gear 10 also helps minimize the maneuvering forces that the actuator 5 needs to apply in order to move the wheel 4 between the deployed POSD and retracted POSR positions. This means that an electric motor, or indeed a small jack, for example an electric or pneumatic jack, can be used as an actuator 5.

In addition, once the wheel 4 is in the deployed position POSD and the strut 3 has been locked, the actuator 5 may be deactivated, i.e., it may be controlled in order not to provide any force or torque on the second connecting link 32. Indeed, locking the strut 3 advantageously makes it possible, owing to the use of the main and secondary braces, to effectively keep the wheel 4 in the deployed position without the actuator 5 providing force or torque.

Moreover, the first connecting link 31 and the second connecting link 32 may be of different lengths. In particular, a first length of the first connecting link 31 may be greater than a second length of the second connecting link 32, in accordance with the example shown in the figures. These differences in length of the first and second connecting links 31,32 help minimize the forces required for the actuator 5 to maneuver in order to move the wheel 4 between the deployed position POSD and the retracted position POSR.

Furthermore, for the example shown, the axis of rotation AX32 of the second connecting link 32 in relation to the structure 41 coincides with the axis of rotation AX5 of the electric motor constituting the actuator 5, and these axes of rotation AX31,AX56 form a plane perpendicular to the direction Z.

Alternatively, the axis of rotation AX56 of the sixth mechanical link 56 and the axis of rotation AX32 of the second connecting link 32 in relation to the structure 41 may form a plane perpendicular to an axis of displacement AX2 of the shock-absorber 2 in the deployed position POSD.

Moreover, these axes of rotation AX56,AX32 of the first connecting link 31 in relation to the shock-absorber 2 and of the second connecting link 32 in relation to the structure 41 may also be substantially coplanar with the axis of rotation AX51 of the first mechanical link 51 in the deployed position POSD. As a result, when the first connecting link 31 and the second connecting link 32 are straight, they are aligned.

The architecture of the landing gear 10 may be defined such that the axis of rotation of the connecting rod 6 in relation to the rocker arm 1, i.e., the axis of rotation AX53 of the third mechanical link 53, is aligned with the axis of displacement AX2 of the shock-absorber 2 when the shock-absorber 2 is compressed under the effect of a force substantially equal to a predetermined force and the wheel 4 is in the deployed position POSD. The axis of displacement AX2 of the shock-absorber 2 may be an axis of translation of the stem 21 in relation to the body 22. In this configuration, when the connecting rod 6 is straight, the connecting rod 6 is aligned with this axis of displacement AX2 of the shock-absorber 2. The shock-absorber 2 is thus compressed when a considerable force, part of which is directed vertically upwards, is applied to the wheel 4. Such a considerable force may be applied to the wheel 4, in particular when the aircraft 40 makes a hard landing.

Figure 4:
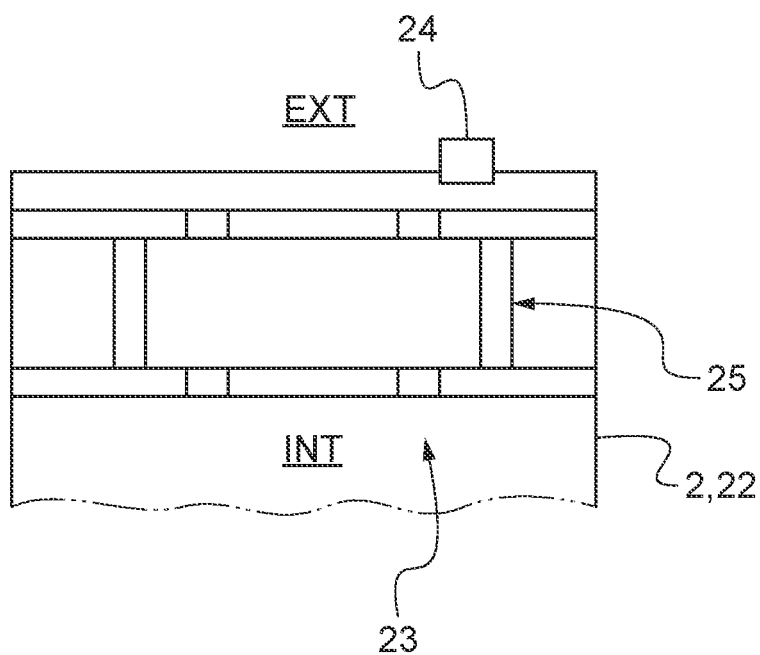
FIG. 4 shows an end-of-travel stop of the shock-absorber of the landing gear of FIG. 1 in the retracted position.

The shock-absorber 2 may also comprise a deformable end-of-travel stop 23 arranged in the body 22. This end-of-travel stop 23 is positioned in the body 22 and configured to be deformed when the shock-absorber 2 is compressed under the effect of a force greater than the predetermined force. The end-of-travel stop 23 may for example comprise a tube 25 as shown in FIG. 4, the tube 25 being defined and dimensioned to be deformed, for example by buckling, when a force greater than the predetermined force is applied to the shock-absorber 2.

Figure 7:
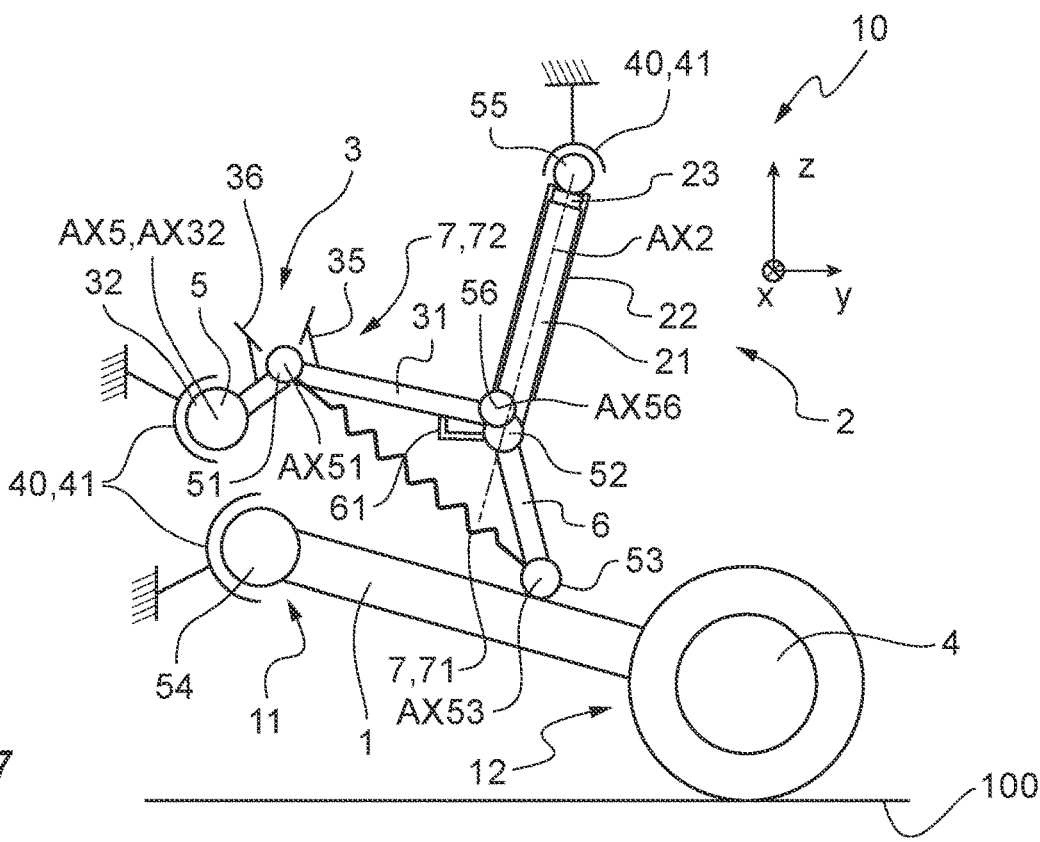

The end-of-travel stop 23 may be deformed directly under a force applied by the stem 21 to the end-of-travel stop 23, the stem 21 then resting against the end-of-travel stop 23, as shown in FIG. 7.

The end-of-travel stop 23 may alternatively be deformed under a force applied by a fluid present in the body 22 and compressed by the stem 21, the stem 21 not then being in contact with the end-of-travel stop 23.

The landing gear 10 may also comprise a lever 61, as shown in FIGS. 5 to 8. The lever 61 is, for example, secured to the connecting rod 6 and configured to be very close to, or indeed in contact with, the first connecting link 31 when the shock-absorber 2 is compressed under the effect of a force substantially equal to the predetermined force. Other arrangements of the lever 61 are possible depending on the kinematics of the landing gear 10. The lever 61 may for example be secured to the stem 21, the stem 21 protruding sufficiently far out of body 22 when the shock-absorber 2 is completely compressed.

FIGS. 5 to 8 show the different positions of the landing gear 10 when the wheel 4 is subjected to a force that gradually increases to a considerable force.

Figure 5:
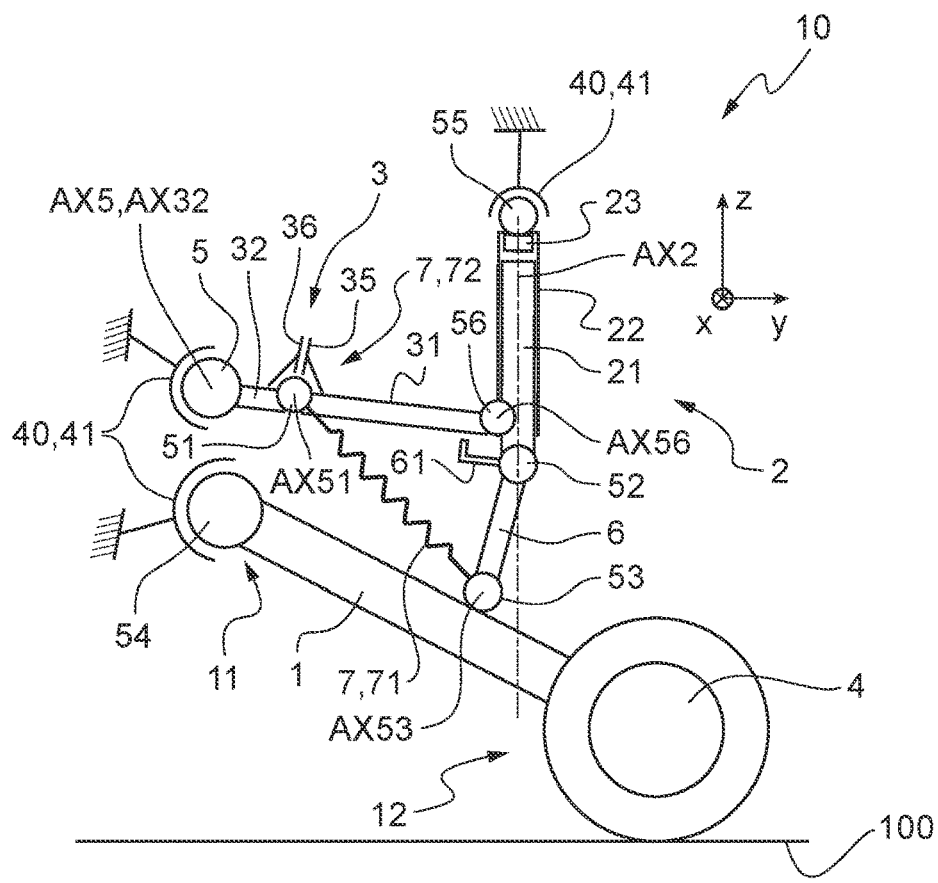
FIGS. 5 to 8 show the landing gear of FIG. 1 in the deployed position.

In FIG. 5, the wheel 4 is in contact with the ground 100. A reaction of the ground is applied to the wheel 4 so that a force less than the predetermined force is applied to the shock-absorber 2. The shock-absorber 2 is in an intermediate position wherein the stem 21 is not resting against the end-of-travel stop 23. The strut 3 is locked as a result of the pulling force of the elastic return member 71 and the stop device 72. The wheel 4 is kept in the deployed position POSD.

Figure 6:
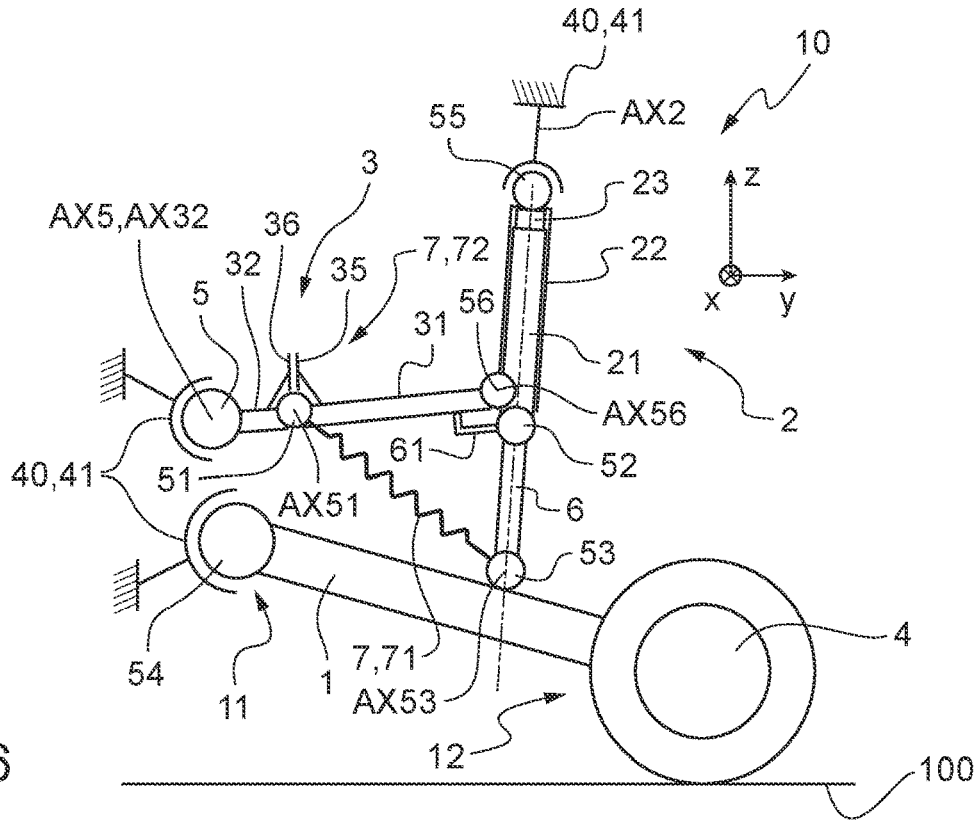

In FIG. 6, the shock-absorber 2 is compressed under the effect of the movement of the structure 41 of the aircraft 40 towards the ground 100. The stem 21 rests against the end-of-travel stop 23 when the force applied to the shock-absorber 2 becomes substantially equal to the predetermined force. The connecting rod 6 is then aligned with the shock-absorber 2 and in particular with the stem 21. This limits the risk of deformation of the connecting rod 6, in particular by buckling. Furthermore, the lever 61 is very close to the first connecting link 31, or indeed in contact with this first connecting link 31. The strut 3 is still locked as a result of the pulling force of the elastic return member 71 and the stop device 72. The wheel 4 is kept in the deployed position POSD.

According to FIG. 7, the force applied to the shock-absorber 2 may become greater than the predetermined force. The end-of-travel stop 23 is deformed, for example the tube 25 buckles. The stem 21 can then move into the body 22 of the shock-absorber 2. The lever 61 moves with the stem 21, causing the first connecting link 31 to move about the axis of rotation AX56 of the sixth mechanical link 56, and consequently causing the second connecting link 32 to move about the axis of rotation AX51 of the first mechanical link 51. The connecting rod 6 is no longer aligned with the stem 21 of the shock-absorber 2. Following the movements of the first and second connecting links 31,32, the strut 3 is no longer locked, despite the pulling force of the elastic return member 71 and the stop device 72. The wheel 4 is then no longer kept in the deployed position POSD.

Figure 8:
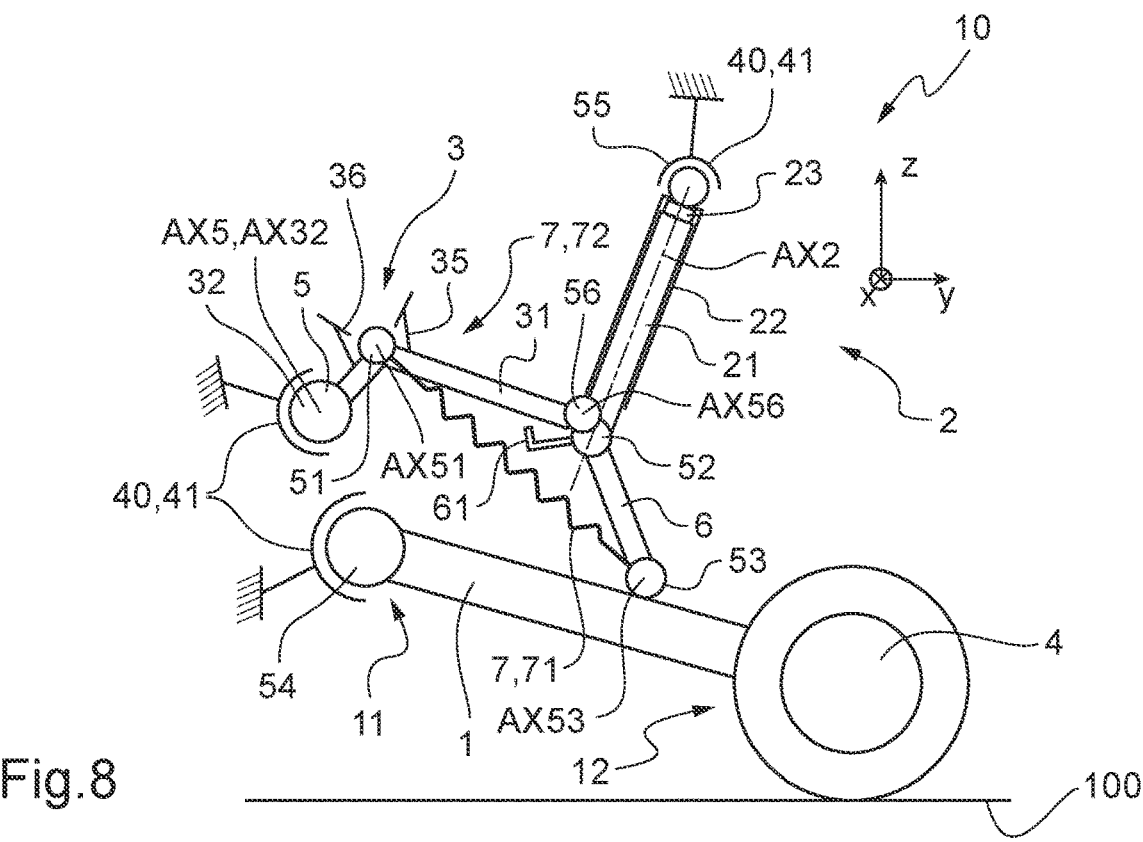

In reference to FIG. 8, following the unlocking of the strut 3, the first connecting link 31 and the second connecting link 32 continue to move in relation to each other, causing the landing gear 10 to retract. Therefore, the considerable force applied to the wheel 4 is not transmitted in its entirety to the shock-absorber 2 and the structure 41 of the aircraft 40, thus preventing damage to the shock-absorber 2 and the structure 41.

Finally, the shock-absorber 2 may comprise a valve 24 shown in FIG. 4. The valve 24 is configured to connect an internal space INT situated inside the body 22 and an external environment EXT situated outside the body 22 when the valve 24 opens. The valve 24 is defined and dimensioned to open when a pressure of a fluid in the body 22 is greater than a predetermined pressure, for example so that the fluid does not prevent the stem 21 from moving in the body 22. Alternatively, this valve 24 may also be configured to connect two chambers to either side of a throttling diaphragm of the shock-absorber 2 when a predetermined pressure is exceeded, in order to reduce the throttling forces and therefore the internal pressure inside the shock-absorber 2.

Naturally, the present disclosure is subject to numerous variations as regards its implementation. Although several embodiments are described above, it should readily be understood that it is not conceivable to identify exhaustively all the possible embodiments. It is naturally possible to replace any of the means described with equivalent means without going beyond the ambit of the present disclosure and the claims.

What is claimed is:

1. A retractable landing gear for an aircraft, the landing gear comprising:
    a rocker arm intended to be hinged to a structure of the aircraft and carrying at least one wheel, the wheel(s) being able to move between a deployed position and a retracted position;
    a shock-absorber provided with a stem that slides in a body, the shock-absorber being intended to be hinged to the structure;
    a strut provided with a first connecting link and a second connecting link that are hinged to each other by a first mechanical link, the first connecting link being hinged to the shock-absorber; and
    an actuator,
    wherein the actuator is intended to be connected to the structure and connected to the second connecting link in order to rotate the second connecting link in relation to the structure, the landing gear comprising:
    a connecting rod hinged to the shock-absorber by a second mechanical link with a single degree of rotational freedom and to the rocker arm, the connecting rod being out of alignment with the shock-absorber when a force less than a predetermined force is applied to the shock-absorber; and
    a locking device comprising an elastic return member and a stop device, the elastic return member being fastened by two ends respectively to the strut and to a hinged assembly comprising the rocker arm, the connecting rod and a third mechanical link between the rocker arm and the connecting rod, the elastic return member applying a pulling force between the strut and the hinged assembly, the stop device being configured to prevent movement of the first and second connecting links in relation to each other about an axis of rotation of the first mechanical link generated by the pulling force when the wheel is in the deployed position.

2. The landing gear according to claim 1, wherein the actuator is a rotary electric motor.

3. The landing gear according to claim 1, wherein the connecting rod is hinged to the stem and the first connecting link is hinged to the body, the body being hinged to the structure.

4. The landing gear according to claim 1, wherein the connecting rod is hinged to the body and the first connecting link is hinged to the stem, the stem being hinged to the structure.

5. The landing gear according to claim 1, wherein an axis of rotation of the first connecting link in relation to the shock-absorber and an axis of rotation of the second connecting link in relation to the structure form a plane perpendicular to an axis of displacement of the shock-absorber, the wheel being in the deployed position.

6. The landing gear according to claim 1, wherein an axis of rotation of the first connecting link in relation to the shock-absorber and an axis of rotation of the second connecting link in relation to the structure and an axis of rotation of the first connecting link in relation to the second connecting link are parallel with each other and coplanar when the wheel is in the deployed position.

7. The landing gear according to claim 1, wherein the elastic return member is fastened by one of its two ends to the first connecting link, to the second connecting link or to the first mechanical link, and by the other of its two ends to the rocker arm, to the connecting rod or to the hinge between the rocker arm and the connecting rod.

8. The landing gear according to claim 1, wherein the connecting rod is straight and aligned with the shock-absorber when the shock-absorber is compressed under a force equal to the predetermined force, the wheel being in the deployed position.

9. The landing gear according to claim 1, wherein the shock-absorber comprises a deformable end-of-travel stop arranged in the body, the end-of-travel stop being configured to be deformed when the landing gear is compressed under a force greater than the predetermined force, the wheel being in the deployed position.

10. The landing gear according to claim 9, wherein the landing gear comprises a lever, the lever being configured to be in contact with the first connecting link when the shock-absorber is compressed under a force equal to the predetermined force, the wheel being in the deployed position, the lever being arranged in such a way as to cause the first connecting link to move when the shock-absorber is compressed under a force greater than the predetermined force and wherein the lever is configured to be in contact with the first connecting link when the stem is resting against the end-of-travel stop.

11. The landing gear according to claim 9, wherein the shock-absorber comprises a valve configured to connect an internal space situated inside the body and an external environment situated outside the body, the valve opening when a pressure inside the body is greater than a predetermined pressure.

12. The landing gear according to claim 1, wherein the landing gear comprises a lever, the lever being configured to be in contact with the first connecting link when the shock-absorber is compressed under a force equal to the predetermined force, the wheel being in the deployed position, the lever being arranged in such a way as to cause the first connecting link to move when the shock-absorber is compressed under a force greater than the predetermined force.

13. The landing gear according to claim 12, wherein the lever is arranged on the connecting rod, or on the stem when the connecting rod is hinged to the stem, or on the body when the connecting rod is hinged to the body.

14. The landing gear according to claim 1, wherein a first length of the first connecting link is greater than a second length of the second connecting link.

15. The landing gear according to claim 14, wherein the second length is between a quarter and a fifth of the first length.

16. An aircraft comprising at least one landing gear according to claim 1.

* * * * *